3,000,913
10-ACETYLOXY DERIVATIVES OF Δ¹,⁴-ESTRADI-ENE 10-XI-17 BETA DIOL-3-ONE DERIVATIVES
Karl Küster-Sange, Berlin-Lichterfelde-Ost, Germany, assignor to Firma Schering A.G., Berlin, Germany
No Drawing. Filed Apr. 11, 1957, Ser. No. 652,089
Claims priority, application Germany Apr. 20, 1956
8 Claims. (Cl. 260—397.4)

The present invention relates to new steroid compounds, and more particularly to steroids which have an acyloxy group attached to the angular 10-carbon atom.

It is a primary object of the present invention to provide a new series of steroid derivatives.

It is another object of the present invention to provide new 10-acyloxy-steroid compounds which have some estrogen action and also have other therapeutic properties.

It is still another object of the present invention to provide a new method which can result in the production of 10-acyloxy-steroid derivatives.

Other objects and advantages of the present invention will be apparent from a further reading of the specification and of the appended claims.

With the above objects in view, the present invention mainly consists in a new series of compounds, namely steroids which have an acyloxy group attached to the 10-carbon atom thereof. The acyloxy group is preferably a lower acyloxy group of up to 4-carbon atoms, and most preferably the acetyloxy group.

It has been found that it is possible to introduce an acyloxy group into the 10-position of a steroid which has a free phenolic hydroxyl group in the 3-position thereof by treatment of the steroid with a heavy metal acylate, preferably in a solvent which is inert to the heavy metal acylate oxidizing agent. The heavy metal acylate should preferably be of tetravalent lead or manganese acylate and most preferably an acetate thereof. The solvent utilized is most conveniently the acid from which the acylate is formed.

Treatment in this manner results in conversion of the 10-position active hydrogen atom, which is in this position due to a rearrangement of the aromatic structure of the ring A in the cycloaliphatic dienone structure, into the acyloxy group. At the same time other active hydrogen atoms of the steroid molecule which are activated by being adjacent a double bond oxygen atom or nitrogen atom can in the same way be converted to an acyloxy group.

It was unknown and unexpected that the 10-position hydrogen atom in the steroid which is adjacent to a carbon-carbon double bond could be activated by treatment with a heavy metal acylate, especially since the hydrogen atom is in the 10-position in the keto form of the compound which first results from the conversion from its tautomeric phenol form, as is illustrated in the following structural equations:

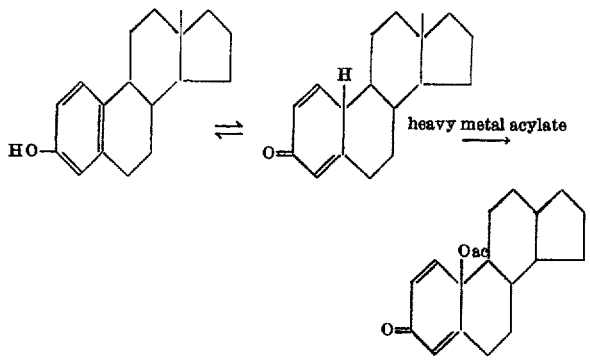

It is thus apparent that the reaction of the present invention is most surprising and could not be predicted based upon the state of the art.

The method of the present invention is applicable to the treatment of all normal steroids which contain a free hydroxyl group in the 3-position thereof to result in the production of the corresponding 10-acyloxy-steroid. Among the suitable steroids which may be acylated in the 10-position thereof in accordance with the present invention are: estradiol; estradiol-17-acetate; 2,4-dibromo-estradiol; estradiol-17-enanthate; 17α-ethyl-estradiol-17-acetate; 17α-butyl-estradiol-17-butyrate; and 17α-methyl-estradiol-17-propionate.

Steroids of the above type when treated with heavy metal acylates, preferably acetates of tetravalent lead or manganese, result in the formation of the corresponding 10-acyloxy derivative. The following are among the compounds which can be produced in accordance with the present invention: Δ¹,⁴-estradiene-10-xi-17β-diol-3-on-10-acetate; Δ¹,⁴-estradiene-10-xi-17β-diol-3-on-10,17-diacetate; 2,4-dibromo-Δ¹,⁴-estradiene-10-xi-17β-diol-3-on-10-acetate; Δ¹,⁴-estradiene-10-xi-17β-diol-3-on-10-acetate-17-enanthate; 17α-ethyl -Δ¹,⁴- estradiene -10 -xi- 17β- diol-3-on -10,17- diacetate; 17α-ethyl -Δ¹,⁴- estradiene -10- xi-17β -diol-3-on-10- propionate -17- acetate; Δ¹,⁴-estradiene-10-xi-17-diol-3-on-10-propionate.

The compounds of the present invention have therapeutic properties and they also serve as a basis for the production of other therapeutically valuable compounds. The compounds of the present invention have some estrogen action and also have a marked effect in reducing the size of the spleen and the thymus as well as an androgen effect.

Thus, for example, Δ¹,⁴-estradiene-10-xi-17β-diol-3-on-10,17-diacetate in a dose of about 200 γ on a castrated rat was found to have a weak estrogen action. This compound is in addition shown to have a very marked effect in reducing the size of the spleen and the thymus, which is provable by a 14 day treatment with daily doses of 1–10 γ. A daily dose of 1000 γ under the same conditions indicates an androgen effect which is recognized by an increase in weight of the seminal vesicles, prostate glands and perputial glands. The adrenal glands are enlarged. The action on the thymus, adrenal glands, seminal vesicles, prostate glands and perputial glands is even more apparent one week after a single injection of 20 mg. and could still be shown 14 days after the injection.

The following examples will further illustrate the present invention. The scope of the invention is, however, not meant to be limited to the specific details of the examples.

*Example 1*

A solution of 8.87 g. of lead tetraacetate in 300 cc. of glacial acetic acid is added under stirring and with the exclusion of moisture from the air to 2.72 g. of estradiol at room temperature. The estradiol goes quickly into the solution in the course of the reaction, the solution becoming gradually a dark red color. In a short time the lead tetraacetate is brought down to a small residue which by the addition of ethylene glycol and stirring of the reaction solution is broken down. After a half hour of stirring the lead tetraacetate is no longer visible.

The reaction solution is introduced into 6 times the amount of water and the reaction product is then extracted by vigorous shaking with methylene chloride. The methylene chloride extract is neutralized by shaking first with sodium bicarbonate solution and then with water. It is then dried with sodium sulfate and evaporated to dryness under vacuum. The thus obtained foamy residue is dried over $P_2O_5$ under vacuum of 1 mm. Hg of pressure. It is then subjected to chromatography over $Al_2O_3$ for purification. The substance is then eluated with methylene chloride and crystallized by rubbing with ether or diisopropyl ether. Recrystallization from isopropanol pure $\Delta^{1,4}$-estradiene-10-xi-17β-diol-3-on-10-acetate. The melting point is 193°–195° C.; UV-spectrum; $\lambda_{max}$ 250 mμ, ε=12660.

Example II

A solution of 4.4 g. of lead tetraacetate in 165 cc. of glacial acetic acid is added dropwise under stirring to a suspension of 1.57 g. of estradiol-17-acetate in 25 cc. of glacial acetic acid. The reaction solution gradually colors to a red-brown. After 2½ hours only a trace of lead tetraacetate is visible, and this is broken down by ethylene glycol. The further working up proceeds as in Example I. The reaction product is $\Delta^{1,4}$-estradiene-10-xi-17β-diol-3-on-10,17-diacetate. After recrystallization from isopropanol the melting point is found to be 215°–216° C. The UV-spectrum is $\lambda_{max}$ 249 mμ, ε=13900.

The same substance can be obtained by acetylation of the product of Example I with acetanhydride and pyridine. On the other hand, the 10-monoacetate can be obtained from the 10,17-diacetate by saponification with methanolic hydrochloric acid.

Example III 4.1 g. of lead tetraacetate in 141 cc. of glacial acetic acid is added dropwise during the three hours under stirring to a suspension of 2.0 g. of 2,4-dibromoestradiol in 40 cc. of glacial acetic acid. The working up and purification follows as in the previous examples. Recrystallization from isopropanol results in pure 2,4-dibromo-$\Delta^{1,4}$-estradiene - 10 - xi - 17β - diol - 3 - on - 10 - acetate; melting point=179.5°–181° C.; UV-spectrum: $\lambda_{max}$ 270 mμ, ε=11920.

Example IV 3.85 g. of estradiol-17-enanthate are dissolved in 50 cc. of dioxane and 300 cc. of a solution of 8.87 g. of lead tetraacetate in glacial acetic acid is added thereto at room temperature dropwise under stirring. The working up proceeds as in the previous examples. Despite chromatographic purification of the crude product only a yellow-brown oil is obtained which cannot be brought to crystallization. IR- and UV-spectrums show that $\Delta^{1,4}$-estradiene-10-xi-17β-diol-3-on-10-acetate-17-enanthate was present. UV-spectrum: $\lambda_{max}$ 248 mμ, ε=9230.

The same compound can be produced by conversion of the 10-monoacetate compound of Example I with enanthic acid anhydride and pyridine.

Example V 2.28 g. of ethylestradiol-17-acetate are dissolved in 20 cc. of dioxane and a solution of 5.91 g. of lead tetraacetate in 175 cc. of glacial acetic acid is added thereto dropwise. The working up is the same as in the previous examples. No crystalline product can be obtained by chromatography. The oil which is obtained by elution with methylene chloride is dried over $P_2O_5$ under a vacuum of 1 mm. Hg of pressure. A foam is thus obtained which can be pulverized. IR- and UV-spectrums show that 17α - ethyl - $\Delta^{1,4}$ - estradiene - 10 - xi - 17β - diol-3-on-10,17-diacetate is present. UV-spectrum: $\lambda_{max}$ 250 mμ, ε=10370.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new composition of matter, 10,17-position lower diacyloxy derivatives of $\Delta^{1,4}$-estradiene-10-xi-17β-diol-3-on compounds, the 10-position acyloxy group of which contains up to 4 carbon atoms.

2. As a new composition of matter, the 10-acetyloxy derivative of $\Delta^{1,4}$-estradiene-10-xi-17β-diol-3-on 2- and 4-bromine derivatives thereof, 17-lower alkyl derivatives thereof and 2-6 carbon atom 17-position esters thereof.

3. As a new composition of matter, a compound selected from the group consisting of $\Delta^{1,4}$-estradiene-10-xi-17β-diol-3-on-10-acetate, $\Delta^{1,4}$-estradiene-10-xi-17β-diol-3-on-10,17-diacetate, 2,4-dibromo-$\Delta^{1,4}$-estradiene-10-xi-17β-diol-3-on-10-acetate, $\Delta^{1,4}$-estradiene-10-xi-17β-diol-3-on-10-acetate-17-enanthate, 17α-ethyl-$\Delta^{1,4}$-estradiene-10-xi-17β-diol-3-on-10,17-diacetate, 17α-ethyl-$\Delta^{1,4}$-estradiene-10-xi-17β-diol-3-on-10-propionate-17-acetate and $\Delta^{1,4}$-estradiene-10-xi-17β-diol-3-on-10-propionate.

4. As a new composition of matter, $\Delta^{1,4}$-estradiene-10-xi-17β-diol-3-on-10-acetate.

5. As a new composition of matter, $\Delta^{1,4}$-estradiene-10-xi-17β-diol-3-on-10,17-diacetate.

6. As a new composition of matter, 2,4-dibromo-$\Delta^{1,4}$-estradiene-10-xi-17β-diol-3-on-10-acetate.

7. As a new composition of matter, $\Delta^{1,4}$-estradiene-10-xi-17β-diol-3-on-10-acetate-17-enanthate.

8. As a new composition of matter, 17α-ethyl-$\Delta^{1,4}$-estradiene-10-xi-17β-diol-3-on-10,17-diacetate.

References Cited in the file of this patent

UNITED STATES PATENTS 2,729,654     Colton                 Jan. 3, 1956